United States Patent [19]

Schlotzhauer et al.

[11] 4,084,187
[45] Apr. 11, 1978

[54] CIRCUIT FOR ACCURATELY EXTRACTING THE SYNCHRONIZATION INFORMATION CONTAINED WITHIN A COMPOSITE VIDEO WAVEFORM

[75] Inventors: Kenneth George Schlotzhauer; Stephen Anthony Roth, both of Beaverton, Oreg.

[73] Assignee: Tektronix, Inc., Beaverton, Oreg.

[21] Appl. No.: 720,854

[22] Filed: Sep. 7, 1976

[51] Int. Cl.² .................................. H04N 5/08
[52] U.S. Cl. ............................................ 358/153
[58] Field of Search ............... 358/148, 153, 155, 156, 358/157

[56] References Cited

U.S. PATENT DOCUMENTS 3,699,256  10/1972  Roth ............................. 358/153
3,706,847  12/1972  Smeulers ...................... 358/153

Primary Examiner—Robert L. Richardson
Attorney, Agent, or Firm—Kenneth M. Durk

[57] ABSTRACT

A circuit for accurately extracting the synchronization information contained within a composite video waveform includes a means for establishing the back porch level of the waveform to a first voltage through a first feedback loop, a means for establishing the sync tip level of the waveform to a second voltage through a second feedback loop, a means for providing the extracted synchronization information at a time determined midway between the first and second voltages, and a system which achieves these ends. An automatic gain control amplifier is included as a portion of the circuit within the system and whose gain is linearly proportional to the logarithm of the AGC voltage and wherein changes in AGC voltage do not interrupt the DC potentials within the amplifier nor do DC changes change the gain of the amplifier.

6 Claims, 7 Drawing Figures

CIRCUIT FOR ACCURATELY EXTRACTING THE SYNCHRONIZATION INFORMATION CONTAINED WITHIN A COMPOSITE VIDEO WAVEFORM

BACKGROUND OF INVENTION

In television systems where only the baseband or TV video is utilized such as in studio equipment and the like where no television carrier is present, satisfactory operation of the system is provided only when the video waveform does not vary in amplitude and is not degraded by the loss of high frequency components, loss of low frequency components, addition of white noise, addition of impulse noise, addition of mains frequency signals, sound-in-syncs, step changes in the DC level and missing lines. As a result of these various degradations, synchronization can become inaccurate and may even be lost.

In U.S. Pat. No. 3,699,256 there is described a circuit for detecting a predetermined level of a composite signal, and in particular the blanking level of a video waveform, comprising a low pass filter means providing a given signal output when the video input is gated at a predetermined level and including feedback means for controlling the amplitude or positioning of the waveform until the level is adjusted relative to gating at the desired valve level. This circuit detects the synchronization pulse despite amplitude variations, loss of high frequency components, loss of low frequency components, addition of white noise, addition of impulse noise, and addition of mains frequency signals.

However, in studio equipment such as most video tape recorders, the video waveform is devoid of lines during a portion of the vertical interval time and the level thereof is at the blanking level. As such, the circuit described in the aforementioned patent is inconsistent with satisfactory operation of video tape recorders (VRT) sources, a definite disadvantage. Also, when an encoded digital signal such as sound-in-syncs is inserted into the composite video waveform (sound-in-syncs is inserted at the horizontal rate during sync tip time), the circuit of the aforementioned patent recognizes the sound-in-sync edges as excessive sync and this, of course, is highly undesirable.

SUMMARY OF INVENTION

According to the present invention, the synchronization information contained within a composite video waveform is accurately extracted therefrom by establishing the back porch level of the waveform to a first voltage then establishing the sync tip level of the waveform to a second voltage and controlling the extraction of the information to a time which corresponds to the midpoint between the two mentioned voltages by utlizing a digital system to achieve these ends. Sound-in-syncs are ignored by a gating circuit making the circuit blind to the sound-in-sync edges. The circuit is also consistent with VTR's in that it relaxes to the back porch level in the absence of an input.

In a preferred embodiment according to the present invention the television composite video input signal is inverted and amplified by an automatic gain amplifier and delivered to an output by a summing amplifier. First, the back porch level is forced to a first voltage level through a feedback loop comprised of a gated back porch comparator, summing amplifier, level memory, low pass filter, AGC amplifier and a summing amplifier under the control of a digital system. Second, the sync tip will be forced to a second voltage level via a self-gated sync tip detector, a second summing amplifier, a second low pass filter, the AGC amplifier, and the summing amplifier to form a second feedback loop using the same digital system control. The desired output is obtained from a comparator where it is extracted at the optimum point, i.e., 50 percent of the distance between the two mentioned voltage levels.

Further in accordance with a preferred embodiment of the present invention, the circuit includes means to control the response to step DC level changes, means for ignoring sound-in-syncs and means for relaxing to the back porch level in the absence of an input.

In addition, the automatic gain control amplifier utilized by the present invention is a new and useful improvement over most gain controlled amplifiers in that the relationship of the current gain of the amplifier to the AGC control voltage is such that the gain linearly proportional to the logarithm of the AGC voltage. The significance of such linear relationship is that the speed of response of the loop is constant enabling maximum response to input variations. Further, the AGC amplifier exhibits yet another improvement over existing gain controlled amplifiers in that changes in the AGC voltage do not upset the DC potentials within the amplifier nor do DC changes upset the gain of the circuit. This independence between gain and DC conditions simplifies the design of control circuits.

It is therefore an object of the present invention to provide a circuit for accurately extracting the synchronization information contained within a television composite video waveform despite the presence of amplitude variations, loss of bandwidth, mains frequency interference, white noise, inputs noise, step changes in DC levels sound-in-syncs, missing lines or other signal degradations.

It is therefore another object of the present invention to provide an automatic gain controlled amplifier having a log-linear relationship between AGC voltage and AGC gain.

The foregoing and numerous other objects, advantages, and inherent functions of the present invention will become apparent as the same is more fully understood from the following description taken in connection with the accompanying drawings wherein like reference characters refer to like elements, and which describes the preferred embodiment of the present invention; it is to be understood, however, that this embodiment is not intended to be limiting nor exhausting of the invention, but is given for purposes of illustration in order that others skilled in the art may fully understand the invention and principles thereof and the manner of applying it in practical use so that they may modify it in various forms, each as may best be suited to the conditions of the particular use. The subject matter regarded as the invention is pointed out and distinctly claimed in the concluding portion of this specification.

DESCRIPTION OF DRAWINGS

In the drawings:

FIG. 3, including

DETAILED DESCRIPTION OF INVENTION

Figure 1:
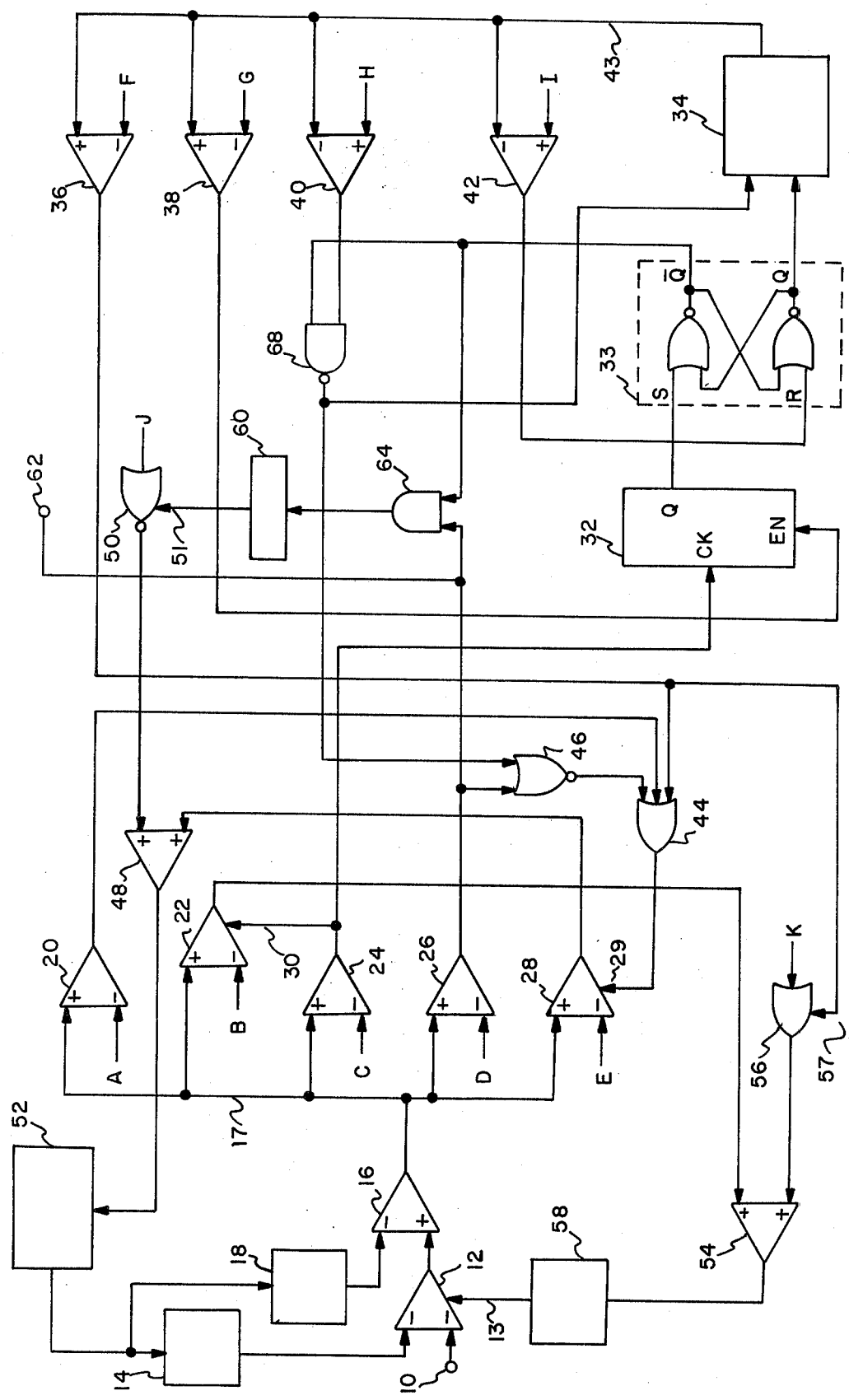
FIG. 1 is a block diagram of the circuit according to the present invention.

Attention is now directed to the drawings, and particularly to FIG. 1 thereof, wherein there is shown, in block diagram form, the circuit for accurately extracting the synchronization information contained within a composite video waveform according to the present invention. As can be discerned, the present invention includes an input 10 for receiving an input signal connected to a first inverting input of an automatic gain amplifier 12 deriving a second inverting input from a low pass filter 14 The output of amplifier 12 is applied to non-inverting input of a summing amplifier 16 which also receives an inverting input from a high pass filter 18. The output of amplifier 16 is simultaneously applied as an inverted replica of the input signal on a common output line 17 to non-inverting inputs of a plurality of comparators defining, respectively, a 125-percent comparator 20, 100-percent comparator 22, 75-percent comparator 24, 50-percent comparator 26 and a 0-percent comparator 28. The inverting inputs of comparators 20–28 are each connected to a source of suitable reference such as indicated by the letters A-E. These sources of suitable reference can be, for example, predetermined operational voltages obtained from a conventional voltage divider.

The output of comparator 24 is utilized to enable the comparator 22 via the enable input 30 thereof and simultaneously therewith as the clock input (CK) to a one-shot multivibrator 32 whose Q output is the set (S) input of an RS flip-flop 33. The Q output of flip-flop 33 is coupled to timing ramp generator 34, the output of which is applied simultaneously to a further plurality of comparators 36, 38, 40 and 42 on a common output line 43. Comparators 36 and 38 each receive the output from timing ramp generator 34 via non-inverting inputs and whose other inputs are for inverting a source of suitable reference such as indicated by the letters F and G applied thereto, whereas the inverting inputs of the comparators 40 and 42 receive the output from timing ramp generator 34 and whose non-inverting inputs are coupled to sources of suitable reference such as indicated by the letters H and I.

The outputs from comparators 20 and 36 define inputs of a logical OR gate 44 having yet another input obtained from a logical NOR gate 46. The output of OR gate 44 is utilized to enable the comparator 28 via the enable input 29 thereof, which in turn, supplies its output to the first non-inverting input of a summing amplifier 48 whose second non-inverting input is derived from a logical NOR gate 50. Summing amplifier 48 is provided with a level memory 52, the output of which is applied to amplifiers 12 and 16 through filters 14 and 18, respectively. The output of the comparator 22 is coupled to the first non-inverting input of a second summing amplifier 54 whose second non-inverting input is derived from a logical OR gate 56. Summing amplifier 54's output is applied through second low pass filter 58 as the gain control of AGC amplifier 12 via a control input 13 thereof.

Logical NOR gate 50 and OR gate 56 each have inputs obtained from suitable sources of reference such as indicated by the letters J and K and which are enabled from the output of an excess sync detector means 60 and the output of comparator 36, respectively. The enable inputs of gates 50 and 56 are labeled 51 and 57 respectively.

The output of comparator 26 is the synchronization information accurately extracted from the input signal, say a composite video waveform applied at the input 10 and such synchronization is available at an output 62. Additionally, the extracted information is utilized as one input to the already mentioned logical NOR gate 46 and as one input to a logical AND gate 64. The output of AND gate 64 is coupled to the excess sync detector means 60 whereas the second input thereto is the $\overline{Q}$ output of the RS flip-flop 33. The $\overline{Q}$ output is also coupled, along with the output of comparator 40, to a logical NAND gate 68 whose output is the second input to the logical NOR gate 46. The output of the NAND gate 68 is also simultaneously applied to a second input of the timing ramp generator 34. Additionally, the outputs of the comparators 38 and 42 are the enable (EN) and reset (R) inputs to the one-shot multivibrator 32 and RS flip-flop 33, respectively.

Considering overall operation of the FIG. 1 circuit, a composite video signal applied to input 10 is inverted and amplified by the AGC amplifier 12 and delivered simultaneously to the comparators 20, 22, 24, 26, and 28 by the summing amplifier 16. First, the back porch level of the signal supplied from summing amplifier 16 on the line 17 is forced to the reference level E through the feedback loop comprised of the gated comparator 28, summing amplifier 48, level memory 52, low pass filter 14, AGC amplifier 12 and the summing amplifier 16. Secondly, the sync tip of the output from summing amplifier 16 will be forced to the reference level B via the self gated sync tip comparators 22 and 24, summing amplifier 54, low pass filter 58, AGC amplifier 12 and the summing amplifier 16. The output signal at the output 62 is, of course, extracted at the optimum point, i.e., 50 percent of the distance between the back porch and sync tip.

When the voltage of the waveform supplied by summing amplifier 16 exceeds the reference source C, the comparator 24 initiates a trigger (clock) to the one-shot multivibrator 32. Assuming that the output of timing ramp generator 34 is greater than the reference source G at this instant, one shot multivibrator 32 will be enabled, and thus respond to this clock, via the comparator 24, to set RS flip-flop 33. The Q output of this flip-flop prompts the timing ramp generator 34 to initiate a rundown of a linear ramp being produced thereby. As soon as the linear ramp is less than the reference source G, one-shot multivibrator 32 becomes disabled by the retrigger comparator 38, thus ignoring any further clocks from comparator 24. When the linear ramp is less than or equal to the reference source I, comparator 42 resets RS flip-flop 33 which, in turn, causes a reversal in the direction of the linear ramp being produced by timing ramp generator 34. With the $\overline{Q}$ output of RS flip-flop 33 at a high level and the output of the comparator 40 at a high level, logical AND gate 68 passes a logical zero to gate 46. If, as is usually the case, the waveform from summing amplifier 16 is less than the reference source D at this time, comparator 26 will supply a logical one to gate 46, and thus an enable pulse to the comparator 28 via the gate 44. In the event that the signal from summing amplifier 16 is greater than the reference source D, the gating operation is inhibited which is an appropriate response because back porch samples should not be attempted during long vertical pulses. The gating pulse is terminated when the ramp being produced by ramp timing generator 34 exceeds the reference source H to give a logical zero out of logic gate 68, thus a zero out of logic gate 44. It should be noted that the output of the gate 68 also instructs the timing ramp generator 34 to slow the rate of increase of the linear ramp being produced. Thus, three ramp rates of the linear ramp must be tailored to suit the details of the particular waveform to be measured.

As was stated in the Summary of Invention, the circuit responded to degraded signals; this will now be explained. Slow amplitude variation of the composite video waveform within the range of gain of the AGC amplifier are connected by the previously described loop comparing AGC amplifier 12, summing amplifier 16, comparator 22, comparator 24, summing amplifier 54 and low pass filter 58. A sudden drop in the amplitude of the composite signal applied to input 10 is detected by the output of comparator 36, assuming the amplitude drop exceeds 25 percent and a trigger was not provided to the one shot multivibrator 32. The output of comparator 36 enables comparator 28 and logic gate 56. The latter increase the gain of the AGC amplifier 12 and the former restores the amplitude of the signal out of summing amplifier 16 to the level of reference source E. These combined adjustments assure that subsequent leading edges of sync will be in the correct spot to trigger one-shot multivibrator 32 and re-establish normal operation. Fast amplitude variations of small extent (plus and minus 25-percent) are connected by the slow feedback path comprising AGC amplifier 12, summing amplifier 16, comparator 22, comparator 24, summing amplifier 54 and low pass filter 58. Fast amplitude increases exceeding 50 percent are detected by comparator 20, which prohibits the voltage level out of summing amplifier 16 from exceeding the level of reference source A by downward adjust of the DC level. It is left to the normal loop previously mentioned to correct the gain.

Loss of low frequency bandwidth and the presence of mains frequency interference are both corrected by the same mechanism. Line to line samples of the back porch level are stored on the level memory 52; the low pass filter 14 then feeds this information into the AGC amplifier 12 such as to reject the variation of position on back porch samples. Tilts occurring on the back porch are rate limited by the level memory 52 but then coupled through high pass filter 18 such as to directly correct the tilt of the waveform out of summing amplifier 16. The loop is thus comparator 28, summing amplifier 48, level memory 52, high pass filter 18 and summing amplifier 16. White noise on the back porch is averaged by the level memory 52 to avoid disturbing the control loops. The gating techniques are nearly insensitive to impulse noise because the one-shot multivibrator 32 is only retriggerable in a narrow time window when the ramp produced by timing ramp generator 34 is above the reference source G. Furthermore, an impulse noise trigger at this point does not cause a difficulty provided the back porch is correctly positioned. (Both impulse and white noise sufficient to switch comparator 26 will appear at the output 62, but system operating stability continues in their presence.) Response to step DC level changes is established by several mechanisms: If a video directed shift occurs, a trigger into one-shot multivibrator 32 will be missed thereby triggering comparator 36 and thus increasing the AGC gain via logic gate 56, summing amplifier 54, low pass filter 58 and pushing the DC level of the output of summing amplifier 16 towards the level of reference source E via gate 44, gate 56, summing amplifier 48, level memory 52, low pass filter 14, AGC amplifier 12 and summing amplifier 16; (Subsequent back porch samples will correct the shift.) if a large sync directed shift occurs, the output of logical gate 64 will indicate that the output level of summing amplifier 16 is greater that reference source D when the single-shot has been reset, a condition which normally occurs for only 3 lines in the vertical interval of the composite video waveform; if the output of logical gate 64 remains at the one level for the equivalent of more than three lines, the excess sync ratio detector 60 enables logical gate 50, resulting in a video directed restoration via summing amplifier 48, level memory 52, low pass filter 14, AGC amplifier 12 and summing amplifier 16.

Sound-in syncs are ignored by the disabling of one-shot multivibrator 32 before RS flip-flop 33 is reset, thus making the circuit non-responsive (blind) to the sound-in sync edges. Furthermore, the excess sync ratio detection does not concern itself with what occurs during sync tip time by reason of the $\bar{Q}$ output of flip-flop 33 being held low. In fact, $\bar{Q}$ can be used as a conventional sync output when sound-in-syncs are present in the input waveform. Sound-in-syncs are not a problem for the AGC loop as sync tip comparator 22, enabled at 75 percent by the comparator 24, simply adjusts the system gain until many sync tips have the correct amplitude. As has also been previously stated, many video tape recorders omit lines in the vertical interval and remains at the back porch level. The present circuit is consistent with this practice in that it relaxes to the back porch level in the absence of an input. For satisfactory operation with VTR sources it is appropriate to slow the AGC more than usual to avoid large gain changes induced by the loop comprising comparator 36, logic gate 56, summing amplifier 54, low pass filter 58 and the AGC amplifier 12.

It may be observed in studying the foregoing specification of the FIG. 1 embodiment that the same has not been burdened by the inclusion of large amounts of detailed and specific information relative to such matters as circuitry, memory structure, logic and timing, etc., since all such information is basically well within the skill of the art as of the present date. Examples of technical publications already in existence and relating to such aspects are set forth hereinafter, with the basic technical information set forth in each incorporated herein by reference. U.S. Pat. No. 3,699,256, issued to Stephen A. Roth, a co-inventor of the subject invention; Computer Logic Design, by M. Morris Mans, copyright 1972 by PRENTICE-HALL, INC.; and Integrated Electronics Analog and Digital Circuits and Systems, by J. Millman and C. C. Halkias copyrighted 1972 by McGraw-Hill, Inc.

Figure 2:
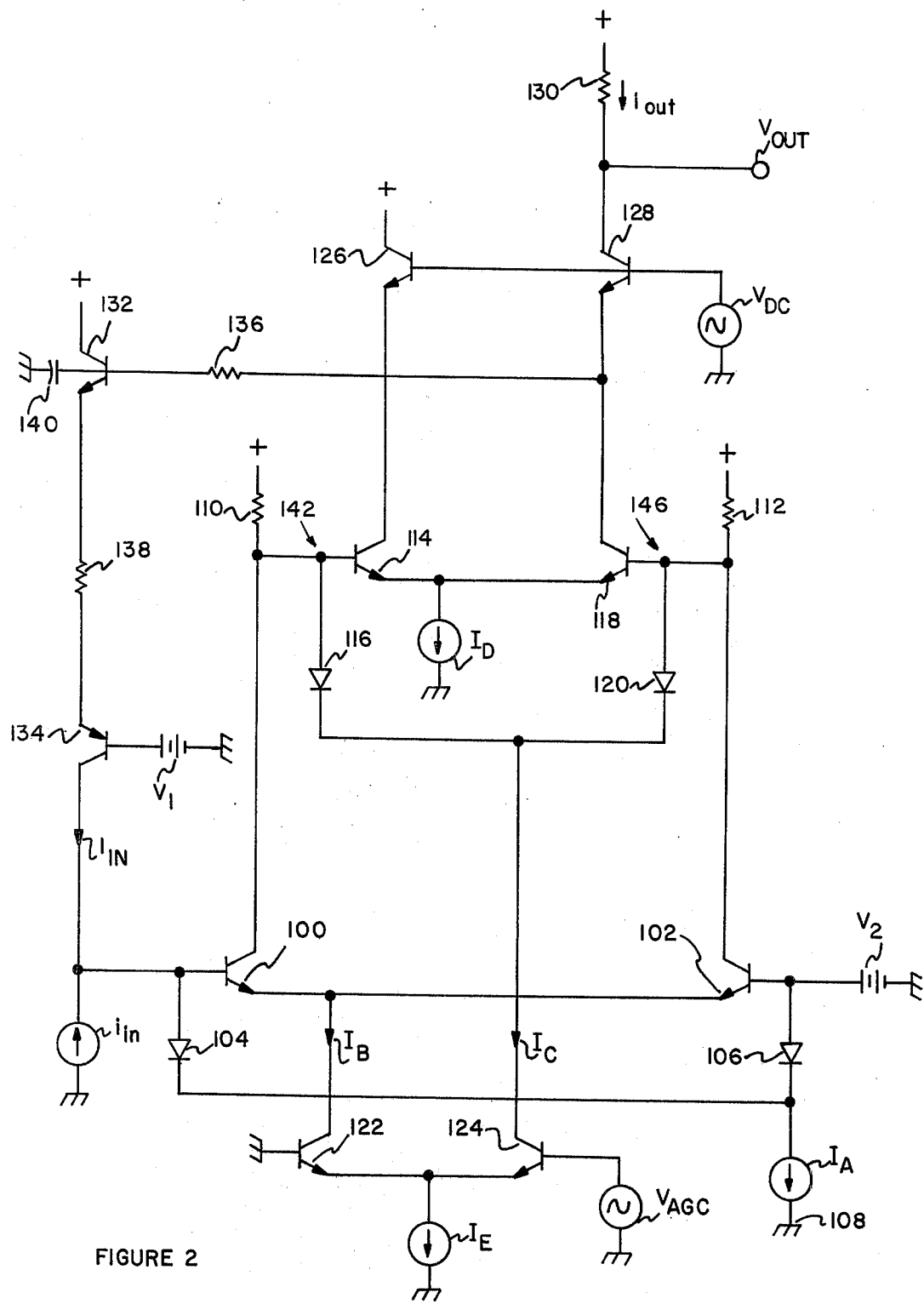
FIG. 2 is a simplified schematic diagram of the AGC amplifier of the FIG. 1 circuit.
Figure 3A:
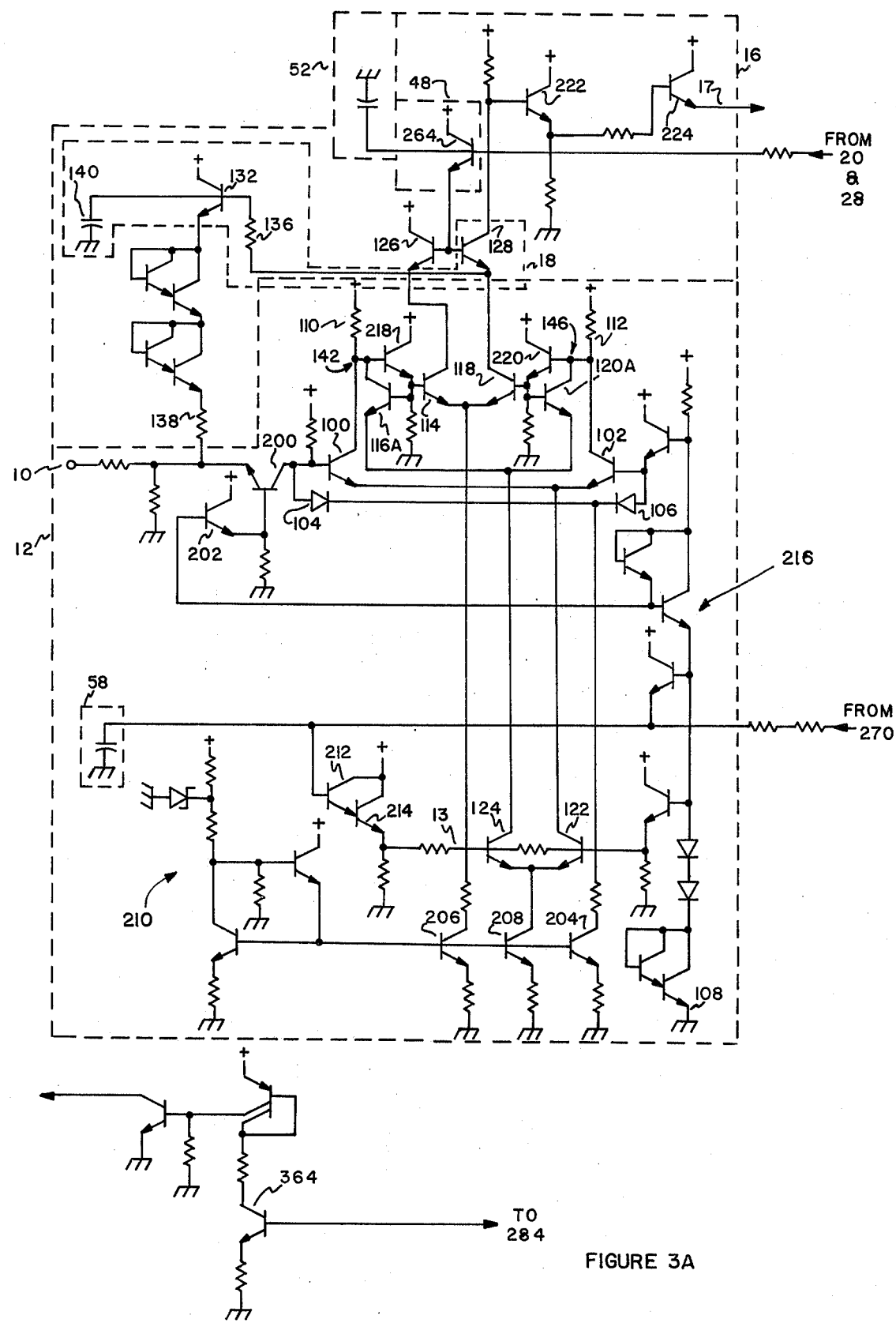
FIGS. 3A, 3B, 3C and 3D, is a schematic diagram of the FIG. 1 circuit.
Figure 3B:
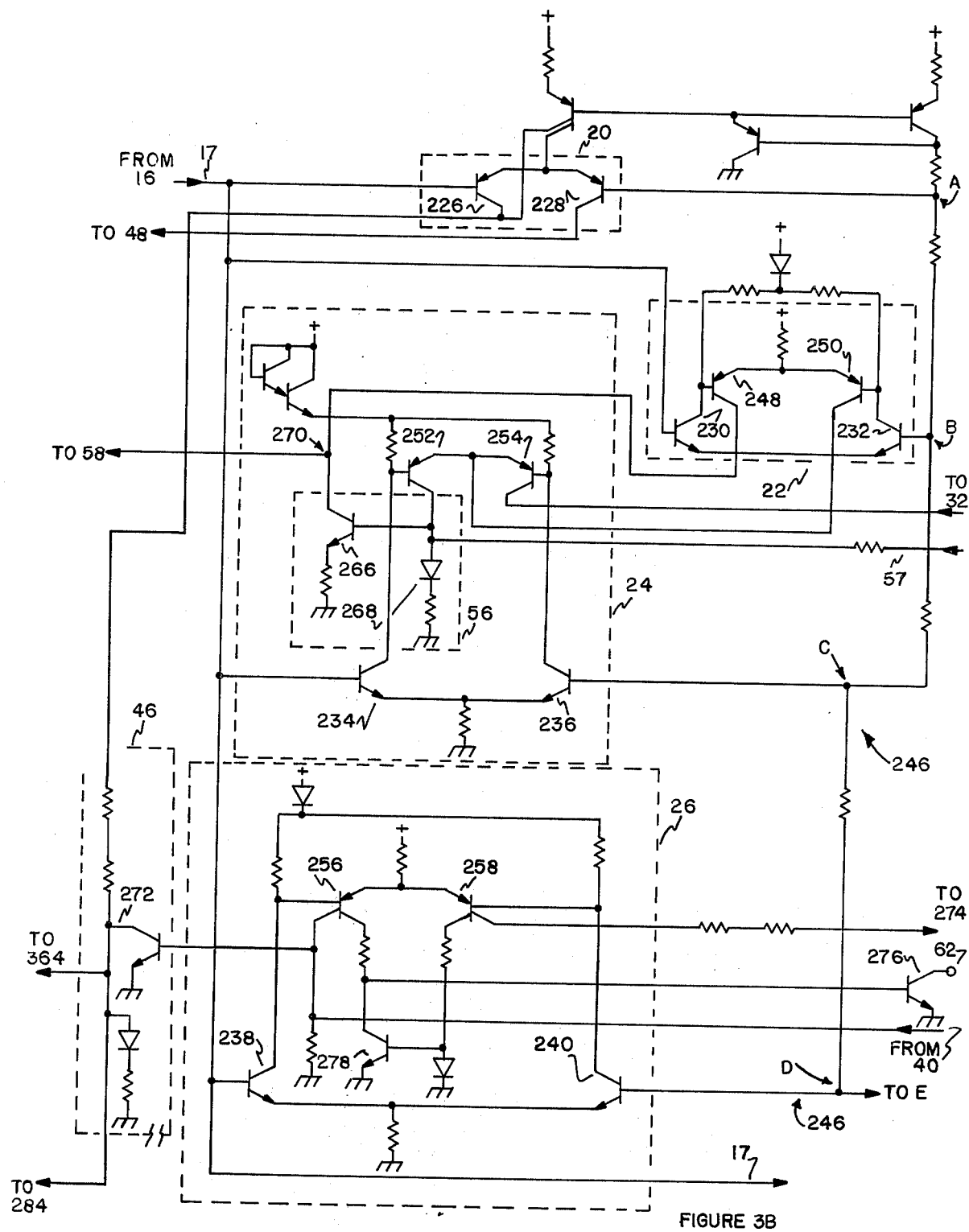
Figure 3C:
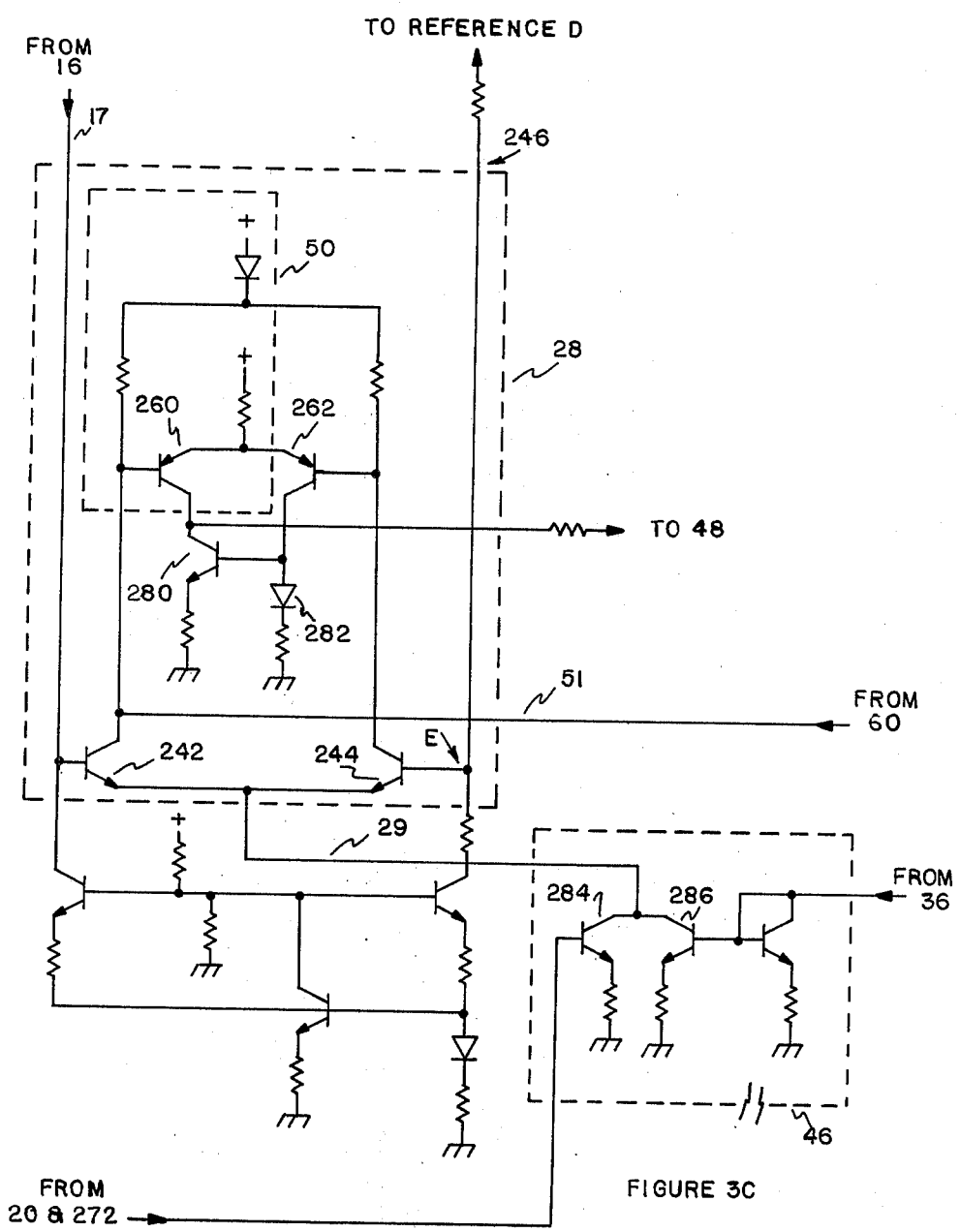
Figure 3D:
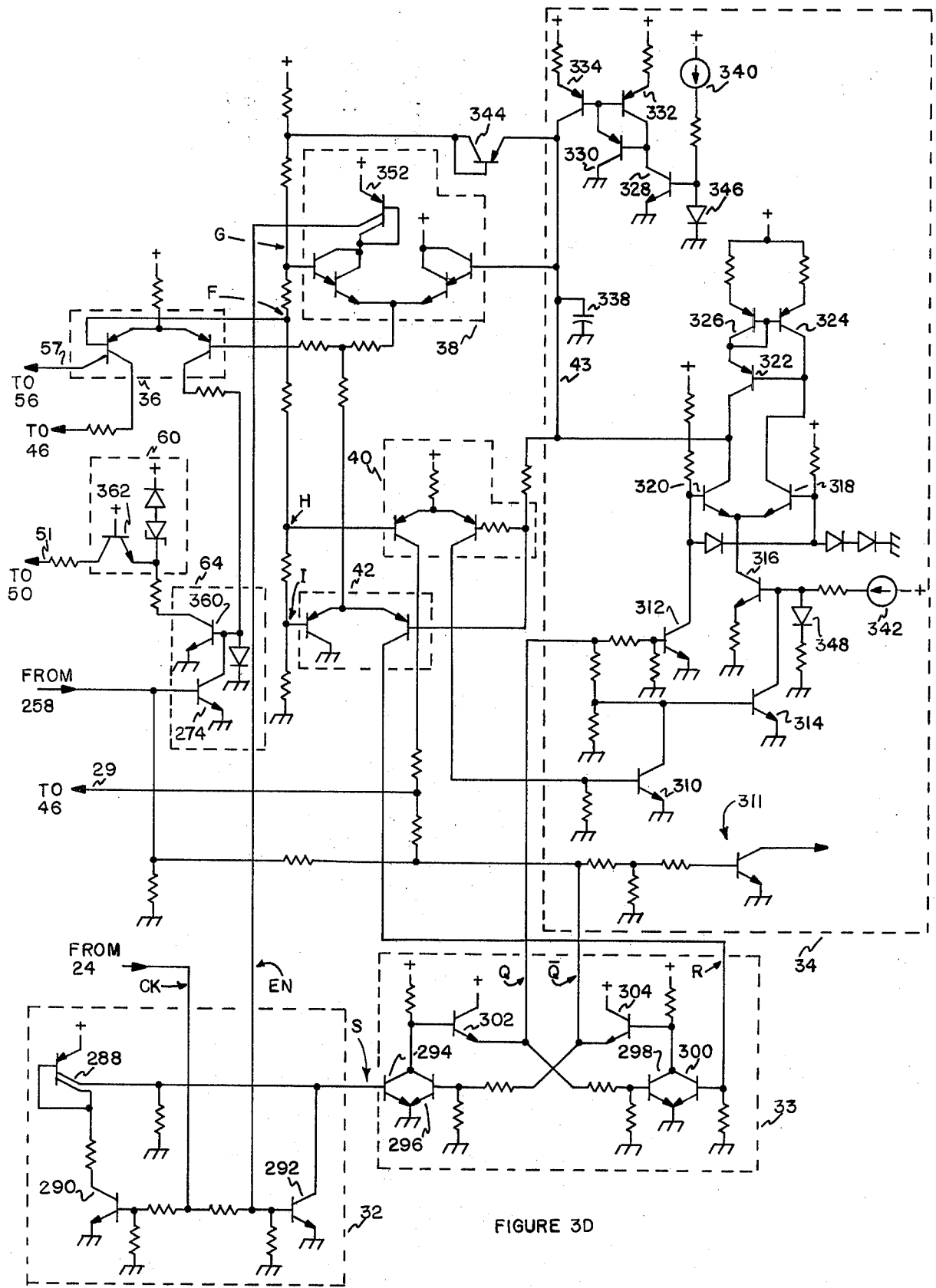

Referring now to FIG. 2, there is shown in simplified form the AGC amplifier 12 according to the present invention. In this simplified form, a single ended input current provided by current source $i_{in}$ is coupled to the base or control terminal of a transistor 100, which in association with the transistor 102 and diodes 104, 106 comprise a pair of differentially connected control devices (the base or control electrode of transistor 102 is coupled to a potential $V_2$) having a pair of semiconductor junction devices which exhibit logarithmic characteristics substantially compensating for non-linear properties of the pair of differentially controlled devices, whereby a linear rather than a nonlinear amplifier current output is produced; such circuit is the linear multiplier circuit (gain-cell) as fully described in detail in U.S. Pat. No. 3,689,752 by Barry Gilbert and assigned to the assignee of the subject invention. It will be understood that diodes 104, 106 can be transistors connected to provide semiconductor junctions, say, defining emitter base diodes. In the subject circuit, the cathodes of the diodes are coupled together and therefore a current supplied by current source $I_A$ flows therethrough to a common return terminal 108. Additionally, the collectors of transistors 100 and 102 are coupled via resistors 110, 112 respectively, to a source of reference potential, +, and each collector is also coupled to the base and anode of transistors and diodes 114, 116 and 118, 120 respectively. The emitters of the transistors 114, 118 are coupled together and therefore a current supplied by current source $I_D$ flows therethrough to the common return terminal. The cathode of the diodes 116, 120 are coupled together as are the emitters of the transistors 100, 102 and a current $I_B$ and $I_C$ flow from these devices to the common return terminal as a total current flow supplied by current source $I_E$ via an emitter coupled amplifier defining transistors 122, 124. The base of control terminal of the latter transistor is coupled to be controlled by a voltage representing a changing voltage, i.e., $V_{AGC}$, whereas the base of the former is coupled to the common return terminal.

A pair of transistors 126, 128 define the output stage of the amplifier and each has it's base on control terminal referenced to a changing voltage source $V_{DC}$ whereas the emitters are directly coupled to the collectors of transistors 114, 118 respectively. The collector of transistor 126 is directly coupled to a source of reference potential whereas the collector of transistor 128 is coupled to a source of reference potential via an output resistor 130 wherein a current $i_{out}$ flows. An output, $V_{out}$, is taken from the collector of transistor 128. A feedback network comprising transistors 132, 134, the resistors 136, 138, capacitor 140 and a voltage source $V_1$ (voltage source $V_1$ coupled to the base of transistor 134) is disposed between the emitter of the transistor 128 and the base of transistor 100. As a result of this feedback network, a current $I_{IN}$ flows as indicated.

To understand circuit operation, assume initially that $V_{DC}$ is fixed such that $$I_{IN} = (I_A/2). \quad (1)$$

As the amplifier is comprised of two cascode gain-cells (components 100/102/104/106 and components 114/116/118/120) and treating transistor 128 as a cascode output for the upper gain-cell, it can be shown that the current gain of the stage, $A_I$, is given by:

$$A_I = i_{out}/i_{in}$$

$$A_I = (I_D/I_A)(I_B/I_C), \quad (2)$$

where the shunting of the resistors 110, 112 is ignored and the alpha of the transistors (or diodes if transistor connected) is assumed to be equal to 1. Thus, the differential or emitter coupled amplifier comprising transistors 122, 124 gives a transfer function of:

$$(I_C/I_B) = EXP(V_{AGC}/V_T), \quad (3)$$

where $V_T$ is equal to $KT/q$ where $K$ equals Boltzman's Constant (1.38 × 10$^{-23}$ joules/°K), T equals absolute temperature in degrees Kelvin, and $q$ equals the charge on one electron (1.6 × 10$^{-19}$ coulomb); 26 mV at room temperature. Combining the two relations of (2) and (3) and reformulating in decibel notation yields:

$$A_{IdB} = 20 \log_{10}(I_D/I_A) - K(V_{AGC}/V_T), \quad (4)$$

wherein $K$ is defined as $20 \log_{10} e = 8.69$ and $V_T$ is as previously defined. This log-linear relationship is desirable as it ensures an equal settling time from similar dB input amplitude changes, regardless of the gain prevailing at the moment of the amplitude change.

Considering next the DC conditions within the amplifier, as previously mentioned the transistor 128 cascodes the output of the upper gain cell; in addition, for slow changes in $V_{DC}$, transistor 128 operates as an emitter follower, moving the voltage across the capacitor 140 and thus $I_{IN}$; and finally, for fast changes in $V_{DC}$, transistor 128 acts as a common emitter amplifier where:

$$(V_{out}/V_{DC}) \approx (R130/R136). \quad (5)$$

Thus, it is seen that $A_I$ is independent of $I_{IN}$, and thus of $V_{DC}$, except during rapid changes in $V_{DC}$. Transistor 126 is provided to maintain the collector/base voltage low, and thus minimize the thermal distortion in the upper gain cell.

Finally, consider the direct current voltages at the junctions 142 and 146:

$$V_{142} = V_{146}$$

$$V_{142} = V_{cc} - (R112)(I_E)/2, \quad (6)$$

where $V_{cc}$ equals the source of reference potential indicated (+) on the diagram. Thus, as the voltage $V_{AGC}$ changes, the direct current potentials within the circuit are unchanged. This indpendence of gain on $V_{DC}$ and direct current conditions on $V_{AGC}$ simplifies the design of the control signals.

Figure 4:
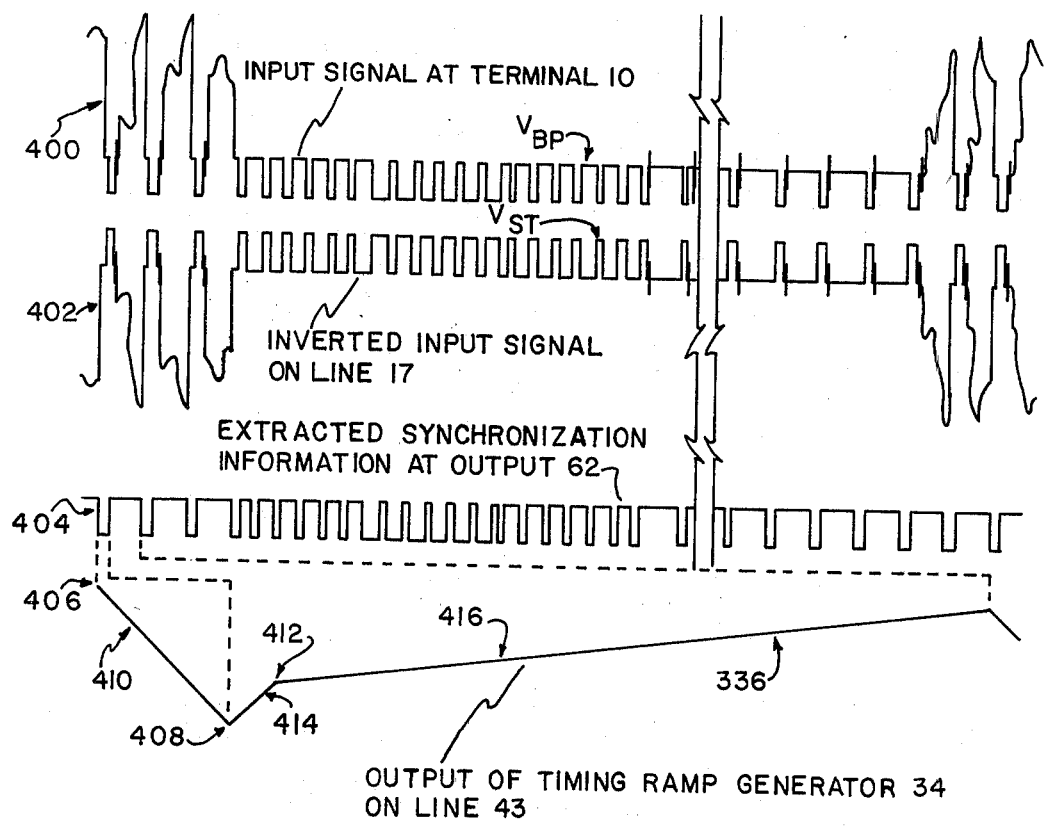
FIG. 4 is a waveform graph of various waveforms at various locations employed in explaining the present invention.

In as much as the foregoing specification is directed toward those skilled in the art, it is still deemed desirable, however, to provide a complete schematic of the invention (no component values are given for obvious reasons). Such diagram is shown in FIG. 3 and will now be described to show techniques for this practice or implementation of different parts of the combination to be claimed later in the specification. Reference should also be made to FIG. 4 which shows various waveforms at various locations in the circuit. These waveforms are employed for explaining the invention. As can be discerned, the preferred embodiment of the invention is a combination of interconnected circuit elements inseparably associated within a continuous substrate and contained in a single package. This integrated circuit preferably includes both passive and active elements fabricated by well-known techniques, for example, as described in "Electronic Devices and Circuits" by J. Millman and C. C. Halkias, copyrighted 1967 by McGraw-Hill, Inc., pages 418-449. It is to be understood, however, that the circuit can be made up from individually distinct components, i.e., discrete components. Additionally, the portions of the circuit within dashed lines correspond to the blocks in FIG. 1 having the same reference numerals applied thereto.

The AGC amplifier 12 in the preferred embodiment is seen to comprise a modified version of the simplified FIG. 2 embodiment. A first modification is the addition of an NPN common-base transistor 200, the emitter of which receives the composite video at the input terminal 10 from which is extracted the synchronization information contained therein and the feedback current from low pass filter 14. The base of transistor 200 is controlled by the voltage applied thereto via an emitter follower transistor 202; this control voltage is the voltage $V_1$. The collector of the transistor 200 is coupled to the base of transistor 100, such base serving as both inverting inputs to the AGC amplifier. The current sources for providing the currents $I_A$, $I_D$ and $I_E$ are the transistors 204, 206 and 208, each of which has its control electrode or base set to provide the required current by conventional means for establishing the quiescent operating points of the amplifier as well as other circuit criteria such as temperature and stabilization of the transistor parameters. This means is generally indicated by 210.

The voltage $V_{AGC}$ is applied to the base of transistor 124 via a "Darlington" follower comprising the transistors 212, 214 whose purpose is to buffer the voltage applied to control the differential pair 122, 124 and reducing the gain control sensitivity thereof. As can be discerned, the AGC voltage is the voltage across a capacitor defining low pass filter 58. Reference potentials for the differential pair 122, 124 as well as the voltages $V_1$ and $V_2$ are derived from a voltage divider network comprising a plurality of diode connected transistors and diodes disposed between a source of potential and the common return terminal 108. This divider is conventional circuitry well known to those in the art and will not be described. The divider is, however, generally indicated at 216. Another modification to the AGC amplifier is the addition of a pair of NPN emitter follower transistors 218 and 220 disposed between the junctions 142, 146 and the base of transistors 114, 118 of the upper gain cell. In addition, the diodes 116, 120 have been replaced by transistors 116A, 120A and are in effect diode connected. The addition of the transistors 218, 220 increases the cell gain.

Operations of the circuit is identified to that given for FIG. 2 when an input waveform is applied to the input terminal 10 and, as previously discussed, the amplifier has the advantages over most gain controlled amplifiers in that there is a particular transfer function between the gain of the amplifier, that is the ratio of output current to input current, and control voltage. In the subject amplifier this ratio is in relationship to the AGC control voltage applied to the "Darlington" follower already discussed such that the gain is linearly proportional to the logarithm of the AGC voltage. Such relationship is unique and its significance is best illustrated by an example. For instance, suppose due to some external condition it were necessary for the AGC amplifier 12 to change its gain by a factor of 10 because the input signal dropped by a factor of 10. Then, due to the property of having a linear gain versus logarithmic AGC voltage characteristic it would take exactly the same time to respond to that factor of 10 regardless of where it started from. So if it was at a very high gain, it would take just as long to increase by a factor of 10 as it would if it was at a very low gain. This is by virtue of the fact that the log linear behaviour of the transistor characteristic is the input characteristic which transforms an input voltage into a logarithmic current. A second significant advantage of the subject AGC amplifier is that as the AGC voltage is changed, the DC position that the gain cells are set at does not change. In other words, as the AGC voltage changes, the DC potentials within the circuit are unchanged. This independence of gain on DC voltages simplifies the design of control signals.

As has been previously stated, the pair of transistors 126, 128 define the output stage of the AGC amplifier 12. More specifically, the transistor 128 forms the input portion of summing amplifier 16 with its emitter and base serving as the non-inverting and inverting inputs thereof respectively, and operates as both an emitter follower amplifier and as a common base amplifier. The output of the summing amplifier 16 is via emitter follower transistors 222 and 224 for providing on the line 17 the inverted replica of the input signal; line 17 is, of course, utilized to simultaneously apply the inverted input signal to the comparators to be hereinafter described.

Comparators 20, 22, 24, 26 and 28 are each seen to comprise at least a pair of emitter coupled transistors 226-228, 230-232, 234-236, 238-240 and 242-244. The first mentioned transistors of each differential pair have their control or base electrodes coupled to receive the inverted input signal on the line 17 whereas the second transistors of each pair have their control or base electrodes coupled to the sources of suitable references A-E respectively, which in the preferred embodiment are predetermined voltages developed across a typical voltage divider indicated generally at 246. These voltages represent the voltages against which the inverted input signal is compared and such voltages do not, of course, exceed the maximum common-mode range of the comparators. With the exception of the comparator 20, each comparator includes a second pair of emitter coupled transistor pairs 248-250, 252-254, 256-258 and 260-262. The first mentioned transistors of each second pair have their control or base electrodes coupled to be responsive to the collector voltage of the first transistors of the first differential pair whereas the second mentioned transistors have their control or base electrodes coupled to be responsive to the collector voltage of the second transistor of the first pair. By cascading these two pairs of differential amplifiers, a larger amplification of the difference signals is provided.

The first output of comparator 20, the collector of transistor 228, is applied to the first non-inverting input of summing amplifier 48 for application to the level memory 52. As can be discerned, summing amplifier 48 defines an emitter follower transistor 264 and level memory 52 defines a capacitor. It should also be noted that this output of comparator 20 differs somewhat from the block diagram wherein such output is shown as the input to a logic gate 44 for enabling the comparator 28. This difference lies in the fact that the implementation utilizes a current to drive the capacitor of level memory 52 rather than a voltage. However, the effect is the same. A second output, the collector of transistor 226, of the comparator is provided but its function description will be referred to later in this description.

The output of the comparator 22 is the collector of transistor 248 and current supplied therefrom is utilized for feeding the low pass filter 58, another capacitor. The output of the comparator 24 defines the current via the collector of transistor 254, such current being used to drive the one-shot multivibrator 32. Included as a portion of the comparator 24 is a transistor 266 and a diode 268 which form a current mirror. This current mirror circuit arrangement can be thought of as being the logical gate 56 enabled via the line 57. The output of this gate, the collector current of transistor 266, is also utilized to feed the low pass filter 58. As has been previously stated, the comparators 22 and 24 are self-gated and this is accomplished by feeding the current via transistor 250 to the emitters of transistors 252-254 in a conventional manner.

To provide a further explanation of comparators 22, 24 and the current mirror arrangement, assume that the inverted input signal on line 17 is sufficiently high enough in amplitude that the reference source C has been exceeded and that the input signal has caused the comparator 22 to begin switching whereby equal currents are flowing through the transistors 248 and 250. Under these conditions, transistor 252 is conducting all the current available from transistor 250 as is the diode 268. Thus, the transistor 266 mirrors a current equal to the current via transistor 248 and the net, or total, current available to feed capacitor 58 at the junction 270 is zero. Thus it can be seen that at the junction 270 there is provided an apparent summing device. This summing device is depicted in FIG. 1 as the summing amplifier 54.

The outputs of the comparator 26 are seen to be obtained from a plurality of collectors associated with both transistors 256 and 258. Each collector is proportioned during the manufacturing process so as to provide about 50 percent of the total transistor current. The first output, first collector of transistor 256, is utilized to drive a grounded emitter transistor 272 whereas the second collector of transistor 256 drives a second grounded emitter transistor 276, the output of which is defined as output 62. This output is the accurately extracted synchronization information sought. In addition, the third and fourth outputs of comparator 26 are the first and second collectors of the transistor 258; the third output is utilized to drive another grounded emitter transistor 274 whereas the fourth output is utilized to drive yet another grounded emitter transistor 278. Transistor 278, which is also coupled to drive transistor 276 insures that synchronization information is availably at the output 62 at all times.

The output of the comparator 28 is the collector of transistor 260 which feeds capacitor 52 via summing amplifier 48, or transistor 264. Similar to the gated comparators 22, 24 this comparator also includes a current mirror arrangement comprising the transistor 280 and a diode 282 and also enables the charge in capacitor 52 to be varied in either direction dependent upon the conduction of transistors 260 and 262. It should also be pointed out that the transistor 260 also defines logical gate 50 of the FIG. 1 embodiment and it is enabled via the line 51 with a signal obtained from excess sync detector 60.

Comparator 28 is enabled, or controlled, by controlling the emitter current to the differential pair comprising transistors 242 and 244. This controlling current is obtained via transistor 284 or 286 dependent upon (a) an input from comparator 20, (b) an input from comparator 36, or (c) from the comparator 40 via the transistor 272 already discussed. These three conditions for controlling the emitter current of transistor 242 and 244 will be covered elsewhere in this specification.

As has been previously stated, the collector of transistor 254 provides a current which is utilized to clock the one-shot multivibrator 32 which comprise the transistors 288 and 290. In addition, a transistor 292 is included therein as the enable to the one-shot 32 (more specifically a disable to flip-flop 33) which is controlled by the output of comparator 38. In operation, as long as the timing ramp being generated by ramp timing stage 34 is above the reference source G, transistor 292 will be biased into saturation thereby effectively grounding the input to flip-flop 33. Once comparator 38 switches, transistor 292 becomes non-conductive and the one-shot is responsive to the trigger or clock supplied via comparator 24. Once clocked, the one-shot sets the RS flip-flop 33 now to be discussed.

Flip-flop 33 comprises a plurality of cross-connected emitter coupled transistors 294-296 and 298-300 as well as the emitter follower transistors 302 and 304. The control or base electrodes of the transistors 294 and 300 define respectively, the set and reset inputs to this flip-flop. The Q output of the flip-flop is taken on the emitter of transistor 302 and utilized as the input to timing stage 34 whereas the $\overline{Q}$ output is utilized to control, for one, the charge on level memory 52 via circuits yet to be considered. As the flip-flop is a conventional sequential digital system well known, no further discussion thereof is deemed necessary.

The circuit comprising transistors 310, 312, 314 . . . 334 define the timing ramp generator stage 34. This circuit provides on the line 43 the linear ramp depicted in the FIG. 4 embodiment as the waveform 336. The ramp is produced across a timing device such as the timing capacitor 338 in accordance with currents derived by current source means 340 and 342. In addition to the above-listed transistors, a diode connected transistor 344 is provided to prevent saturation of transistor 334 thereby latching the ramp produced to a desired level. Before describing the circuit however, it should be mentioned that the current sources 340 and 342 may be variable so that the ramp rate can be varied. In the circuit implementation shown, current source 340 provides a current of about 17 microamps whereas current source 342 provides a current of about 415 microamps to produce the waveform 366 as shown.

Current via current source 340 flows through a diode 346 thereby causing the transistor 328 to produce a mirror current in the collector thereof which is equal in magnitude to the current via current source 340. This current is supplied via the transistor 332, which, in association with the transistors 330 and 334 form a current regulating circuit or current source as described in U.S. Pat. No. 3,588,672 by G. R. Wilson and assigned to the assignee of the subject invention. As such, a current equal in magnitude to the current via current source 340 is provided via transistor 334 to the timing capacitor 338.

Current via current source 342 flows through a diode 348 thereby causing the transistor 316 to produce a mirror current in the collector thereof. This mirror current can only be provided if the transistor 314 which along with the transistors 310 and 312 form a switching arrangement to control the direction of the ramp being produced, is nonconductive. The grounded emitter transistors 312 and 314 have their base or control electrodes connected to be operatively responsive to the Q output of the flip-flop 33 and the grounded emitter transistor 310 to be operatively responsive to the output of comparator 40; the transistor 310 being operatively disposed about the transistor 314 so as to over-ride any response by transistor 314 to the Q output under certain pre-established conditions.

Transistors 318 and 320 form an emitter coupled differential amplifier for switching the current via transistor 316 either into timing capacitor 338 or away therefrom. For example, assume for the moment that the transistors 312 and 314 are both non-conductive. Under this condition, the timing current will pass via transistor 320 because of the biasing arrangement of the differential pair. As transistor 318 is non-conductive, no current is available from the transistors 322, 324 or 326 (these transistors form another current source as described in the Wilson patent) and must be supplied from capacitor 338. Under these conditions, the waveform 336 is caused to ramp down. The slope of this ramp, indicated by 410, is therefore set by the summation of the currents supplied by the two current sources 340 and 342.

Assume now, however, that transistor 312 is conductive but that transistor 314 is held non-conductive via the over-ride transistor 310. Current via transistor 316 is now switched through transistor 318, and due to the action of current source transistors 322, 324 and 326, a mirror current will flow through transistor 322. Since transistor 320 is non-conductive, the mirror current is supplied to the capacitor 338 thereby causing the ramp to ramp up. The slope of this ramp is indicated by 414. Finally, with the transistor 316 non-conductive the ramp will ramp up as indicated by 416 at the rate determined solely by the current via transistor 340.

The timing ramp is applied via the line 43 to the plurality of comparators 36, 38, 40 and 42 which like the previously mentioned comparators, each contain at least one pair of emitter coupled transistors having one control or base electrode connected to the sources of reference potential and having another controlling member coupled to the line 43. In the implementation of the circuit, the comparator 38 utilizes a "Darlington" emitter coupled pair. In addition, the "Darlington" is also utilized as an emitter follower amplifier for providing the waveform on line 43 to the control electrode of the comparator 36. The output of comparator 38 is obtained from the collector of an additional transistor 352 whenever the waveform on line 43 is above the reference source G which is utilized to disable the set input of the flip-flop 33.

When the signal on the line 43 is below the reference F, an output from comparator 36 is applied to the gate 64; when the signal is above the reference F, a first output is obtained to enable the gate 56 and a second output is obtained to enable the comparator 28 via the gate 46. The output of comparator 40 is applied to the gate 46 when the signal on the line 43 is below the reference level H or to the switching arrangement of timing generator 34 when the signal on the line 43 is above level H. The output of comparator 42 is the reset input to the flip-flop 33 when the signal on the line 43 is below the reference level I. Inasmuch as the comparators are similar to the previously mentioned comparators no further discussion thereof is believed necessary.

As can be discerned from the drawing, the gate 64 includes the grounded emitter transistor 274 whose base electrode is responsive to the signal from comparator 26 or the $\bar{Q}$ output of flip-flop 33. The conduction of transistor 274 prevents a transistor 360 from responding to a signal obtained from comparator 36 which would otherwise respond thereto. Any output of transistor 360 is applied to excess sync detector 60 comprising the transistor 362. Transistor 362, in turn, is responsive to the signal at the collector of transistor 360 and enables the gate 50 via the line 51.

Considering now the operation of the circuit detailed in FIG. 3, assume that there exists at the input terminal 10 a composite video signal 400 as shown in FIG. 4. (Note: waveforms shown in FIG. 4 are not drawn to scale.) The signal 400 is easily recognized by those familiar with NTSC television practices as detailing the field blanking details of the NTSC composite video signal during field one. It should be pointed out that any composite video signal such as, for example, PAL or SECAM could have been used as the circuit can easily be modified to operate thereon but the description to follow applies strictly to NTSC principles. Before proceeding however, it should be pointed out that the signal on the line 17, signal 402, is forced to the following conditions: the back porch is DC restored to the voltage level $V_{BP}$ by adjustment of the DC input of the AGC amplifier 12; the sync tip ($V_{ST}$) is set to a voltage level ($V_{BP}$ + 1 volt) by the adjustment of the gain of the AGC amplifier 12; and the synchronization information (waveform 404) available at the output 62 is picked off at a voltage level of $V_{BP}$ + 0.5 volts or midway between $V_{BP}$ and $V_{ST}$.

As the leading edge of sync passes the ($V_{BP}$ + 0.75) volt level, the one-shot multivibrator 32 is triggered; further, assuming the output of the timing ramp generator 34 exceeds the reference level G, then the comparator 38 will provide a trigger enable pulse to the one-shot and a set pulse is delivered to the flip-flop 33, changing its state. This state change initiates a timing cycle rundown of the waveform 336 from the level 406 to the level 408 along the line 410 as determined by the current sources 340 and 342. When the level of the waveform 336 falls below the reference G, the output of the one-shot is inhibited. The voltage level 408 is reached after about 0.5 microseconds, which enables comparator 42 which resets flip-flop 33. The flip-flop, in turn, initiates the runup from level 408 to the level 412 along the line 414, also determined by current supplied from current source 340 and 342.

The combination of the flip-flop output and comparator 40 output yield a gate pulse occurring during back porch time and this pulse is about 2.5 microseconds wide. This gate signal gates the comparator 28 which, in turn, forces the DC operating point of the AGC amplifier such that the signal on the line 17 equals $V_{BP}$ during back porch time. Comparator 24, during this period, inhibits the taking of incorrect samples during the vertical sync pulses of the composite video signal.

When the comparator 40 observes that the waveform 336 is greater than or equal to the reference H, it switches the charging rate of the ramp timing generator by allowing only current determined by current source 340 to charge capacitor 338. When the ramp reaches the reference voltage G, some 50 microseconds later, the comparator 38 enables the one-shot for a next trigger. The comparator 24 is self enabled at ($V_{BP}$ + 0.75) volts then forces the gain of the AGC amplifier to be such that the voltage on the line 17 is equal to ($V_{BP}$ + 1) volts whenever the voltage on the line 17 is greater than ($V_{BP}$ + 0.75) volts. The feedback path is very slow due to the value of the capacitor 58 and requires several fields to reach equilibrium; in contrast, the DC feedback achieves its ends in a very few lines.

The comparator 26 operates the sync output switch, transistor 276, and then generates the output synchronization at the output 62, correctly picked off at the 50-percent point of the incoming sync pulse at input terminal 10.

Now, consider a normal input, non-equilibrium condition. Consider initially no input; under this condition the ramp waveform on line 43 will run out along the line 416 to the level 406 where it is caught by the diode 344. The comparator 36 will then open the gate of the comparator 28, setting the voltage on the line 17 to $V_{BP}$;

it will also adjust $V_{AGC}$ to increase the gain of the AGC amplifier. Equilibrium will be reached when the gain attains its maximum value. The output sync will indicate no sync as the voltage on the line 17 is less than ($V_{BP}$ + 0.5) volts.

When an input signal is provided, the first positive excursion above ($V_{BP}$ + 0.75) volts of the signal on the line 17 will start the timing cycle and initiate a sample to be taken by the comparator 28, as previously discussed. If the first trigger is the correct one (a leading edge of sync), then the system will settle in a direct manner to the normal equilibrium condition; however, if the first trigger occurred elsewhere, for example, a step on the video portion of the line, the chain of events is complex. However, the system is forced to now converge to the normal equilibrium by the excess sync comparator 20, which adjusts the DC input of the AGC amplifier to keep the voltage on the line 17 less than ($V_{BP}$ + 1.5) volts and the excess sync ratio detector 60, which increases the gain if the signal on the line 17 exceeds ($V_{BP}$ + 0.5) volts on an average basis for more of the time than the known proportion of the composite video.

While there has been shown and described the preferred embodiments of the present invention, it will be apparent to those skilled in the art that many changes and modifications may be made without departing therefrom in its broader aspects. For example, the addition of a grounded emitter transistor circuit indicated generally at 311 whose base is operatively associated with the $\overline{Q}$ output of the flip-flop 33 provides an ideal sound in syncs output. Additionally an external gate, say, corresponding to the backporch of the composite video input signal applied to the input 10 may be coupled directly to the emitters of the differential pair comprising transistors 242 and 244 of comparator 28 to thereby enable the comparator. Also, the output of the gate 64 could be utilized as a sync ratio output and the collector of the transistor 236 in the comparator 20 could be used as a backporch gate output providing the proper output circuit such as that indicated as 364 were utilized. Therefore, the appended claims are intended to cover all such changes and modifications as filed within the true spirit and scope of this invention.

The invention is claimed in accordance with the following:

1. A circuit for accurately extracting the synchronization information contained within a composite video waveform, comprising:
   first means responsive to the waveform for controllably providing the waveform at an output thereof and including means for modifying the waveform to control the waveform at said output;
   second means responsive to the waveform at said output for detecting amplitude levels of the waveform to establish a time occurrence of the waveform and including means for providing a plurality of control signals to said means for modifying to control the waveform at said output, said time occurrence of the waveform defining the synchronization information extracted from the waveform; and
   means responsive to said time occurrence of the waveform for regulating the control and detection of the waveform to establish the synchronization information at first and second amplitude levels and extracting the synchronization information at a third level between said first and second amplitude levels.

2. The circuit according to claim 1 in which said means for modifying comprises:
   first control means having a pair of semiconductor devices responsive to the waveform;
   second control means having a pair of semiconductor devices coupled to the outputs of said first control means;
   amplifier means cascoded to the output of said second control means for providing the waveform at said output; and
   means for controlling said first and said second control means to thereby modify the waveform in a linear logarithmic manner.

3. The circuit according to claim 2, in which said means for controlling comprises:
   first current source means coupled to supply current to one of said pair of semiconductor devices in said first control means;
   second current source means coupled to supply current to one of said pair of semiconductor devices in said second control means;
   third current source means coupled to supply current to the other ones of said pair of semiconductor devices in both said first and said second control means; and
   means coupled between said third current source means and said other ones of said pair of semiconductor devices for steering said third current to said first and said second control means to thereby modify the waveform.

4. The circuit according to claim 1, in which said means responsive to said time occurrence of the waveform for regulating the control and detection of the waveform comprises:
   first means normally in a non-oscillatory state requiring a trigger signal to start a cycle of operation responsive to said time occurrence of the waveform;
   second means normally in a non-oscillatory state requiring a trigger signal to start a cycle of operation responsive to a start of a cycle of operation of said first means;
   third means responsive to a start of a cycle of operation of said second means for providing a timing signal and including means for altering said timing signal; and
   means responsive to said timing signal for providing regulating signals for regulating the control and detection of said waveform to establish the synchronization information.

5. The circuit according to claim 4, in which said means for altering said timing signals define controllable current sources.

6. A method of accurately extracting the synchronization information contained within a composite video waveform, which comprises:
   providing first means responsive to the waveform for controllably providing the waveform at an output thereof, said first means including means for modifying the waveform to control the waveform at said output;
   providing second means responsive to the waveform at said output for detecting amplified levels of the waveform to establish a time occurrence of the waveform and including means for providing a plurality of control signals to said means for modifying to control the waveform at said output, said time occurrence of the waveform defining the synchronization information extracted from the waveform; and providing means responsive to said time occurrence of the waveform for regulating the control and detection of the waveform to establish the synchronization information at first and second amplitude levels and extracting the synchronization information at a third level between said first and second amplitude levels.

* * * * *